United States Patent [19]

Constant

[11] 4,438,491
[45] Mar. 20, 1984

[54] COMPUTER HAVING PLURAL IC CHIPS WITH EACH CHIP INCLUDING A TRANSCEIVER

[76] Inventor: James N. Constant, 1603 Danbury Dr., Claremont, Calif. 91711

[21] Appl. No.: 196,201

[22] Filed: Oct. 14, 1980

[51] Int. Cl.³ .............................................. G06F 13/00
[52] U.S. Cl. ................................................... 364/200
[58] Field of Search ... 364/200 MS File, 900 MS File, 364/712, 490, 491; 29/577 C; 357/19; 365/191

[56] References Cited

U.S. PATENT DOCUMENTS

| | | |
|---|---|---|
| 3,462,742 | 8/1969 | Miller et al. ..................... 364/200 |
| 3,579,201 | 5/1971 | Langley ............................. 364/200 |
| 3,821,715 | 6/1974 | Hoff, Jr. et al. .................. 364/200 |
| 3,939,452 | 2/1976 | Faggian ............................. 364/200 |
| 4,274,104 | 6/1981 | Fang et al. .......................... 357/19 |

*Primary Examiner*—Raulfe B. Zache
*Attorney, Agent, or Firm*—Harris, Kern, Wallen & Tinsley

[57] ABSTRACT

A computer having a plurality of interconnected IC chips. Chips include a transceiver for sending and receiving signals from other chips. By implementing on-chip transceivers, the communication between chips in the computer is done with fewer wires.

30 Claims, 3 Drawing Figures

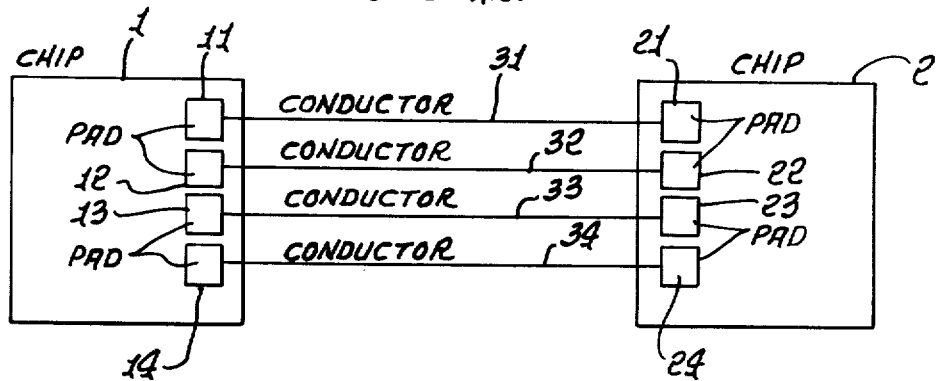
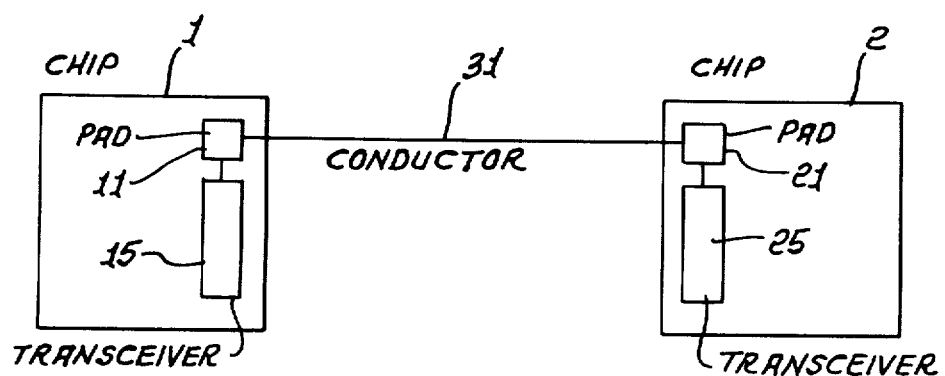
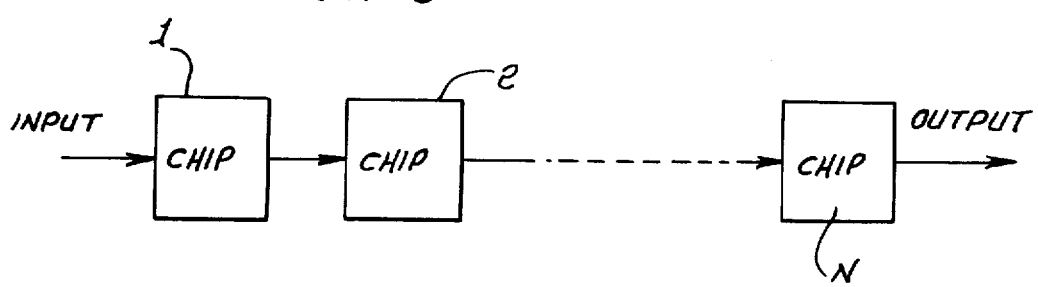

COMPUTER HAVING PLURAL IC CHIPS WITH EACH CHIP INCLUDING A TRANSCEIVER

BACKGROUND OF THE INVENTION

This invention is based on my disclosure document No. 075,160 filed Oct. 20, 1978.

Today upward of $10^4$ transistors can be put on a chip of silicon 1/10 inch square. Fairly straightforward extensions of present technology should make it possible to put $10^5$ transistors and similar devices on a chip within the next few years. The reduction in circuit size already achieved has had two major benefits: a sharp decrease in the cost of logic chips and a sharp increase in the speed with which logic operations can be performed. The present state of the art of monolithic logic chips can be seen in the collection of articles appearing in the Special Issue on Microelectronics of the September 1977 issue of Scientific American. Logic chips are also called integrated circuit IC chips.

Although the present trends to build more complex computers, minicomputers and microcomputers lie in the fabrication process of logic chips, the task of interconnecting or interfacing chips has not kept pace with the circuit density of chips. For example, the design of a computer begins with the determination of the overall organization of the computer, i.e., the interconnection and interfacing of logic chips. The "width" of the machine, or in other words the number of bits in a standard word, is a fundamental consideration; so is the amount of memory to be addressed, which dictates the number of address bits that must be provided. Among the multitude of other considerations, attention must be given to the total number of connections to be made to each chip; each connection requires a metallic pad at the edge of the chip, and there is limited room for these pads (peripheral terminals).

Consider a single logic chip, for example the one shown on the cover of the foregoing Special issue of Scientific American. Arrayed around the chip are 40 leads that connect it with other similar chips in a more elaborate architecture of a modern computer. Typically, the logic chip might represent a read only memory (ROM), random access memory (RAM), a multiplier, adder, subtractor, or even a combination of same, for example as in a monolithic (single chip) microprocessor. Clearly, as shown in the cover picture, the 40 metallic pads at the edge of the chip (plus their associated on-chip buffers, etc.) might account for as much as thirty percent (30%) of the total chip area. Thus, if a chip of silicon is 1/10 inch square then 30% of the area of the chip is devoted to interconnecting and interfacing the chip with its external environment, i.e., with other chips in the computer. Significantly, while the chip area devoted to logic circuits is being drastically reduced by the dramatic increase of circuit density, the remaining area of the chip devoted to interconnecting and interfacing the chip has remained relatively constant. It is the purpose and object of this invention to provide apparatus and method which reduces the areas of logic chips devoted to interfacing chips and which materially reduces the number of wire interconnects between chips in a computer.

SUMMARY OF THE INVENTION

This invention provides apparatus and method for the implementation of a logic chip with reduced number of interface leads.

The general purpose of the invention is to provide new and improved logic chips which can be interconnected in a computer with fewer wires. While the prior art employs multiple leads that require relatively large areas on the chip for interfacing and with multiple wire interconnects between chips, the invention system requires smaller areas on the chip for interfacing and a reduced number of wires for interconnecting chips. Utilizing the system of the present invention, the chip area and interconnections between chips of a modern computer may be reduced significantly over the prior art and thereby for providing new and improved logic chips and computers.

Briefly, the present invention is based on the replacing of groupings of existing (prior art) leads by single leads and using the areas vacated by existing pads and buffers to incorporate on-chip transmit-receive means with results, first, a net reduction of chip area for interfacing and, second, a net reduction of wires for interconnecting chips. Since the chip area for logic circuits is left as before, the chip design is conventional up to that point. However, the distinguishing feature of the invention is its use of on-chip transmit-receive means and the interconection of chips with fewer wires. While the design of a conventional chip, for example the foregoing cover picture, utilizes multiple leads and pads for interfacing leads to the chip, the present invention reduces the number of pads per chip and the number of wires for interconnecting chips.

In view of the foregoing description, the simplicity of construction, minimal area and cost of chips and computers will become apparent. As a result, new and improved chips and computers, in accordance with the present invention, may be produced which are simple, efficient, small in size and weight and economically suited for use and mass consumption in a wide variety of applications, for example computers used in a radar, sonar and communications systems. Accordingly, the present invention may result in the significant reduction in the weight, size, power and costs of radars, sonars and communications systems.

These and other objects and advantages, the nature of the present invention and its various features, will appear more fully upon consideration of the various illustrative embodiments now to be described in detail in connection with the accompanying drawings.

BRIEF DESCRIPTION OF THE DRAWINGS

FIG. 1 is a block diagram of the interfacing and interconnection between two logic chips of the prior art;

FIG. 2 is a block diagram of the interfacing and interconnection between two logic chips of the invention; and FIG. 3 is a block diagram of the interfacing and interconnection of a plurality of logic chips of the invention forming a pipeline processor.

DESCRIPTION OF THE PREFERRED EMBODIMENTS

FIG. 1 is a block diagram of chips 1 and 2 interfaced and interconnected as in the prior art. Chip 1 has four pads 11, 12, 13, 14 and chip 2 has four pads 21, 22, 23, 24. Pads 11, 12, 13, 14 of chip 1 are respectively connected to pads 21, 22, 23, 24 of chip 2 through wires 31, 32, 33, 34. Typically, chip 1 might be a RAM or ROM which is transmitting its data to chip 2 which might be a multiplier adder, subtractor, for example as used in a computer. Or, chip 1 might be a microprocessor sending its signal to chip 2 which might be an arithmetic unit or memory. Not shown in FIG. 1 is the plurality of other chips in the computer which also may interface and be interconnected with chips 1 and 2 separately or these may share lines 31, 32, 33, 34. Nor is there shown in FIG. 1 the buffers, registers and other circuits which may be interconnected to or forming part of lines 31, 32, 33, 34. In FIG. 1, the internal logic circuits of chips 1 and 2 are connected to their respective pads but this has not been shown. Such omissions are not key to the system of the invention but should be understood. Also, it should be understood that while only 4 lines 31, 32, 33, 34 have been shown in FIG. 1, by way of example, these may be any number of M lines, for example a 16 bit (line) bus.

If the area which is allocated to a given pad 11–14 and 21–24 and its associate buffer is A then the total area of a chip 1 or 2 which is used for interfacing is 4A and the number of wires for interconnecting chips 1 and 2 is 4. Similar interfacings and interconnections between other chips in the computer and chips 1 and 2 in FIG. 1 will likewise require on-chip area allocations for interfacing and multiple wires for interconnecting chips, the simple showing of FIG. 1 being to illustrate the invention embodiment that follows.

FIG. 2 is a block diagram of chips 1 and 2 interfaced and interconnected in the system of the invention. In FIG. 2, chips 1 and 2 are almost identical to chips 1 and 2 in FIG. 1 except that pads 12, 13, 14, 22, 23, 24 and wires 32, 33, 34 of FIG. 1 have now been replaced by a transmit or receive means 15 connected to pad 11 in chip 1 and a receive or transmit means 25 connected to pad 21 in chip 2. Thus, while in FIG. 1 each pad is connected to chip circuits (not shown), in FIG. 2 pads are connected to chip circuits via transmit and receive means 15 and 25.

If the on-chip area of a means 15 or 25 is B, the total on-chip area for implementing the FIG. 2 interface is A+B. Clearly, if the area A+B (FIG. 2) is equal or smaller than the area of 4A (FIG. 1) there will be a net saving of at least 3 wires between the prior art FIG. 1 and invention FIG. 2 systems. If A+B=4A then the net saving is 3 wires, namely, wires 32, 33, 34 of FIG. 1 are no longer needed in FIG. 2. There will be reductions in chip size if the area A=B (FIG. 2) is smaller than the area 4A (FIG. 1). Since the number of wires M required by a modern computer is now increasing beyond the present M=16 bus systems, the reduction in chip size which can be achieved using the invention system becomes substantial. Thus, the FIG. 2 system of the invention will provide a reduction in the chip area devoted to interfacing chips and will provide a reduction in the number of wires required to interconnect chips in a computer.

Except for the constraint of size, the system of FIG. 2 defines a conventional communication system, namely, a transmitter 15 sending information to a receiver 25 through pads 11, 21 and line 31. Thus, elements 15, 11, 31, 21, 25 define a micro-communications channel. As such, elements 15, 25 may be any one of a number of types having the required inputs and outputs. In the present disclosure elements 15, 25 might sample, modulate, multiplex or encode information from chip 1 to line 31 and desample, demodulate, demultiplex or decode information from line 31 to chip 2. For example, inputs to transmitter means 15 in FIG. 2 are the inputs previously available to pads 11, 12, 13, 14 in FIG. 1 and outputs from receiver modem 25 in FIG. 2 are the outputs previously available from pads 21, 22, 23, 24 in FIG. 1. In other words, the output from means 25 is the reconstructed image of the input to means 15. Thus, the design problem is for implementing means 15 with a known input and for implementing means 25 with an image output. This is a standard communications task and, therefore, any one of a number of digital or analog signals may be implemented to flow in line 31 of FIG. 2. The system of the invention may use any one of a number of electronic or optical transmitters 15 and receivers 25 to communicate signals from chip 1 to chip 2, the requirement being that the input signal to transmitter 15 becomes available as output from receiver 25. For example, transmitter 15 may be a conventional modulated light source, line 31 may be an optical fiber and receiver 25 may be a light detector, the combination of elements 15, 31 and 25 thereby forming a well known optical fiber communication system. Transmitter 15 may operate as a sequential or parallel transmitter of its parallel inputs, i.e., as a parallel-series or parallel-parallel converter. It will be appreciated that transmitter 15 and receiver 25 are implemented as high density circuits on chips 1 and 2 and, for this reason, their area B is determined by the chip circuit density and not by the prior art pad density (of pads 12–14 and 22–24 in FIG. 1). As a result, a net saving of chip area is realized by the invention system of FIG. 2 compared with the prior art system of FIG. 1.

By way of further example, transmitter 15 may be a high speed digital-to-analog (D/A) converter and receiver 25 may be a high speed analog-to-digital (A/D) converter. For this particular implementation, transmitter 15 converts the digital information from chip 1 into an analog signal which is then inputted to receiver 25 through pads 11, 21 and line 31. Receiver 25 samples the analog signal at the appropriate rate and provides a digital signal (replica of the original input) to chip 2, i.e., receiver 25 reconstructs at its output the signal input to transmitter 15.

In another example, transmitter 15 and receiver 25 may be high speed modems. For this particular implementation, transmitter 15 converts digital information from chip 1 into an analog signal which is then inputted to receiver 25 through pads 11, 21 and line 31. Receiver 25 converts the analog signal into a digital signal (replica of the original input) to chip 2, i.e., receiver 25 reconstructs at its output the signal input to transmitter 15.

In another example, transmitter 15 may be a high speed parallel-in serial-out shift register and receiver 25 may be a high speed serial-in parallel out shift register. For this particular implementation, transmitter 15 converts the parallel digital information from chip 1 into serial digital information which is then inputted to receiver 25 through pads 11, 21 and line 31. Receiver 25 converts the serial digital information from line 31 into parallel digital information (replica of the original input), i.e., receiver 25 reconstructs at its output the signal input to transmitter 15.

In another example, transmitter 15 and receiver 25 may be high speed codecs. For this particular implementation, transmitter 15 converts analog information from chip 1 into a coded signal which is then inputted to receiver 25 through pads 11, 21 and line 31. Receiver 25 converts the coded signal into an analog signal (replica of the original input), i.e., receiver 25 reconstructs at its output the signal input to transmitter 15.

Like their related monolithic RAMs, ROMs, multipliers, adders, etc., monolithic D/As and A/Ds are now available commercially, for example as shown in the article by S. Runyon "Converters are finally blasting off" appearing in the Apr. 12, 1978 issue of Electronic Design. In fact, A/D converters have already appeared on-chip in data acquisition and process control systems, for example the monolithic chips shown in the Runyon article. There appears therefore to be no reason D/A and A/D converters cannot be similarly included in logic chips and interconnected to form computers as specified by the invention.

Monolithic shift registers have been available commercially for some time. In fact, shift registers have already appeared on-chip in imaging systems, for example as shown in the article by W. Kosonocky and D. Sauer "Consider CCDs for a wide range of uses" appearing in the Mar. 15, 1976 issue of Electronic Design. There appears therefore to be no reason shift registers cannot be similarly included in logic chips and then interconnected to form computers as specified by the invention.

Turning next to modems and coders, these circuits are increasingly yielding to total monolithic integration, for example as shown in the articles by S. Alderstein "Modem performance comes in many packages", I. Young et als., "Advanced NMOS Codec-filter chip", and G. Pastorino "Shared Codecs" appearing in the Apr. 12, 1980 issue of Electronic Design.

In another example, transmitter 15 may be a light emitting diode LED and receiver 25 may be a photodetector P. For this particular implementation LED transmitter 15 (with appropriate transmitter circuitry) converts the electrical signal from chip 1 into an optical signal which is then inputted to P receiver 25 through connectors 11, 21 and fiber link 31. P receiver 25 (with appropriate receiver circuitry) converts the optical signal to an electrical signal (replica of the original input), i.e., receiver 25 reconstructs at its output the signal input to transmitter 15.

Optical fiber links have been available commercially for some time, for example as discussed in the article by I. Math "Optical fiber links" appearing in the Apr. 26, 1978 issue of Electronic Design. In fact, fiber links have already appeared in computers, for example as discussed in the article by R. Moulton "Miniaturized, high speed, EMI-proof, optical links fill the bill in computer systems" appearing in the Mar. 1, 1980 issue of Electronic Design. In particular, FIG. 2 of the Moulton article shows how interconnections in a typical computer system divide into intracabinet, intercabinet, and intersite links and, fiber links cost less for intercabinet and intersite cabling runs. In contrast, the invention calls for fiber links between monolithic chips of a computer system.

Basically, the problem that limits the use of optical fibers with chips is connecting fibers to LED 15 and P 25. Thus, while LED 15 and P 25 can be integrated into the chip, it is the interconnecting of chips 1 and 2 with fibers 31 at locations 11, 21 that is too cumbersome, inconvenient and costly. Unlike metal pads 11, 21 connected by a wire 31, the use of connectors 11, 21 connected by a fiber link 31 is less efficient. This means new connectors 11, 21 will be needed to apply optical fibers to the system of the invention. At present, the state of the art of fiber optics is discussed in the article by E. Gadzinski "Fiber Optics" appearing in the February 1980 issue of Circuits Manufacturing. In particular, FIG. 6 of the Gadzinski article shows three possible connection methods, namely, inserting the fiber 31 into LED 15 and P 25, coupling through a lens, and using separable connections. It appears the insertion method is the least objectionable at present. There will be no reason, once the connection problem is solved, that optical transceivers cannot be included in logic chips and then interconnected to form computers.

The article by I. Sutherland and C. Mead appearing in the foregoing Scientific American reference clearly illustrates the "problem" of modern computers. Simply put, the "problem" is that the connecting wires are expensive since these now occupy most of the space and time in the computer. Of course, it is the highly evolved microelectronics technology that has dropped the cost of logic. While in the past it was appropriate to ignore the costs of communications between logic chips of a computer, when the latter were slow and expensive and wires were relatively fast and cheap, the dramatic reduction of logic costs now demands a solution to the problem of communicating between the chips. Thus, if a number of chips are connected in series, as an array or in parallel, for example as shown in the Sutherland article, to form a signal processor then the conventional approach requires that the chips be interconnected with multiple wires, as shown in FIG. 1. In contrast, the invention requires the chips be interconnected with fewer wires, as shown in FIG. 2.

FIG. 3 is a pipeline processor of the invention, by way of example. While in FIG. 3 the chips are shown connected in series, these may be connected equally well to form arrays of chips, with chips in parallel or parallel-series connections, and so forth. In FIG. 3, each chip 1, 2, . . . N has a receiver 25 at its input and a transmitter 15 at its output. Each chip receives an input signal on a single wire at its input and provides an output signal on a single wire at its output. In such a processor, data is passed from one chip to the next, with each chip performing a successive operation on the data. In contrast, the prior art pipeline of N chips would require M wires to and from each chip. The problem gets worse in an array type processor which requires 4M wires to and from each chip. Clearly, the wire "problem" increases both with the number and architecture of chips.

From the foregoing, it will be appreciated that transmitter 15 and receiver 25 may be any one of a number of types including acoustical, electromagnetic and optical means. Chips 1 and 2 each may contain a transmitter 15 and receiver 25. Means 15, 25 may have analog or digital inputs and may provide analog or digital outputs. The means 15, 25 may convert their signals as desired. For example, signals may be amplitude, frequency and phase modulated in the well known manner of conventional communications signals. While electrical and optical signals have been disclosed on lines 31, signals may be acoustic or microwave, for example using surface acoustic waves or microwaves on acoustic or microwave lines 31. Whichever the choice for implementing its communications means (elements 15, 11, 31, 21, 25 in FIG. 2) the idea of the invention is to reduce the on-chip area devoted to interface and to reduce the number of wires needed for interconnecting monolithic chips of a computer. The method of the invention is equally simple, namely, the steps of including at least one of a transmitter and receiver means in a monolithic IC chip and interconnecting chips to form a computer.

As used by the invention, the term "computer" denotes any special or general type computer, for example computers described at pages 627–630 in the book by L. Rabiner and B. Gold "Theory and Applications of Digital Signal Processing" Prentice Hall 1975. However, it is with respect to interconnecting elements of computers wherein the invention differs from the prior art. Thus, while the prior art has achieved improvements at the intercabinet and intersite levels, the invention offers additional improvements at the interchip level.

Also, as used by the invention, the term "monolithic" denotes an integrated circuit IC, for example as shown on the cover and discussed by the various authors in the foregoing Special issue of Scientific American. Thus, the various electronic elements of a monolithic integrated circuit IC are emplaced as a unit on an individual device, fitted with leads and packaged.

From the foregoing, it can be seen that the present invention implements computers with on-chip transceiver means for communicating between chips with a minimal number of interconnects. The invention therefore offers added benefits over the prior art.

In many applications, it is desired to reduce the chip size and number of interconnections between chips in a computer. Such applications may require logical operations which include general purpose, software, special purpose, hardware computers. These may also include computers used to compute mathematical algorithms, for example convolution, correlation and the fast Fourier transform (FFT). The system of the invention performs these tasks more efficiently compared to the prior art systems. Its applications therefore should not only include but will also exceed those of the prior art computers; the latter being limited by the complexity and cost of their wire interconnects.

The present invention offers outstanding practical implementations of chip area and wire number control and should find use in advanced hardware and software computers including minicomputers and microcomputers, for example as used in such diverse systems as radars, sonars, communications systems, electronic and medical test equipment and the like. In particular, the present invention provides simple and economic means for reducing the interfacing and interconnecting requirements of logic chips in computers and thereby for reducing the complexity and cost of such devices. As a consequence, the system of the present invention is expected to facilitate the growth of computers through the reduction in the complexity and cost of interfacing and interconnecting chips, i.e., by decreasing the weight, size, volume and costs of radars, sonars, communications systems, test equipment and so forth.

Although a computer with on-chip communications means has been described, it should be understood that the scope of the invention should not be considered to be limited by the particular embodiments of the invention shown by way of illustration but rather by the appendant claims.

I claim:

1. In a computer with monolithic IC chips interconnected for data transfers, the improvement to reduce the number of interconnections between chips including:
at least some IC chips with a first chip area devoted to one or more logic circuits, a second chip area devoted to interfacing means, and a third chip area devoted to at least one of a transmitter and receiver connected between said logic circuits and said interfacing means,
said interfacing means comprising one or more pads each connected to a conductor for carrying analog signals for interconnecting said IC chips,
said transmitter for receiving first signals from said logic circuits and providing second signals to said interfacing means, and
said receiver for receiving third signals from said interfacing means and providing fourth signals to said logic circuits, said transmitter and receiver including means for handling analog signals.

2. The computer of claim 1 wherein the computer is a general purpose computer.

3. The computer of claim 1 wherein some IC chips are memory chips.

4. The computer of claim 1 including electromagnetic means for interconnecting at least some of said chips.

5. The computer of claim 1 including optical means for interconnecting at least some of said chips.

6. The computer of claim 1 wherein said transmitter includes a light emitting diode and said receiver is a photodetector.

7. The computer of claim 1 wherein at least one of said first and fourth signals are one of analog or digital signals.

8. The method of reducing interconnections between interconnected monolithic IC chips in a computer, including the steps of:
providing at least some IC chips with a first chip area devoted to one or more logic circuits, a second chip area devoted to interfacing means, and a third chip area devoted to at least one of a transmitter and receiver connected between said logic circuits and said interfacing means;
interconnecting said IC chips with analog signals through said interfacing means comprising one or more pads connected to a conductor;
inputting first signals from said logic circuits to the transmitter and providing second signals from the transmitter to said interfacing means; and,
inputting third signals from said interfacing means to the receiver and providing fourth signals from the receiver to said logic circuits.

9. The method of claim 8 including the step of implementing the computer as a special purpose computer.

10. The method of claim 8 including the step of providing a multiplier chip.

11. The method of claim 8 including the step of providing the transmitter as a light emitting diode, and the receiver as a photodetector.

12. The method of claim 8 including the steps of providing at least one of the transmitter, receiver and interfacing means as electrical means.

13. The method of claim 8 including the step of interconnecting some IC chips with optical means.

14. The method of claim 4 including the step of interconnecting some IC chips with acoustical means.

15. The method of claim 8 including the step of interconnecting some IC chips with electromagnetic means.

16. The method of claim 8 including utilizing at least one of said first and fourth signals in one of analog or digital form.

17. The method of claim 8 including producing analog signals at a third chip area transmitter.

18. In a computer with monolithic IC chips interconnected for data transfers, the improvement to reduce the number of interconnections between chips including:
- at least some IC chips with a first chip area devoted to one or more logic circuits, a second chip area devoted to interfacing means, and a third chip area devoted to at least one of a transmitter and receiver connected between said logic circuits and said interfacing means,
- said interfacing means comprising one or more pads each connected to a conductor for interconnecting said IC chips,
- said transmitter for receiving first signals from said logic circuits and providing second signals to said interfacing means, and
- said receiver for receiving third signals from said interfacing means and providing fourth signals to said logic circuits,
- with at least one of said transmitter and receiver incorporating signal processing means for processing the corresponding one of said signals.

19. The computer of claim 18 wherein said signal processing means includes a modem.

20. The computer of claim 18 wherein said signal processing means includes a codec.

21. The computer of claim 18 wherein said signal processing means includes one of sampling and desampling means.

22. The computer of claim 18 wherein said signal processing means includes one of multiplexing and demultiplexing means.

23. In a computer with monolithic IC chips interconnected for data transfers, the improvement to reduce the number of interconnections between chips including:
- at least some IC chips with a first chip area devoted to one or more logic circuits, a second chip area devoted to interfacing means, and a third chip area devoted to at least one of a transmitter and receiver connected between said logic circuits and said interfacing means,
- said interfacing means comprising one or more pads each connected to a conductor for interconnecting said IC chips,
- said transmitter for receiving first signals from said logic circuits and providing second signals to said interfacing means, and
- said receiver for receiving third signals from said interfacing means and providing fourth signals to said logic circuits, said transmitter and/or receiver including one of a D/A and A/D converter.

24. In a computer with monolithic IC chips interconnected for data transfers, the improvement to reduce the number of interconnections between chips including:
- at least some IC chips with a first chip area devoted to one or more logic circuits, a second chip area devoted to interfacing means, and a third chip area devoted to at least one of a transmitter and receiver connected between said logic circuits and said interfacing means,
- said interfacing means comprising one or more pads each connected to a conductor for interconnecting said IC chips,
- said transmitter including a modem for receiving first signals from said logic circuits and providing second signals to said interfacing means, and
- said receiver including an modem for receiving third signals from said interfacing means and providing fourth signals to said logic circuits.

25. In a computer with monolithic IC chips interconnected for data transfers, the improvement to reduce the number of interconnections between chips including:
- at least some IC chips with a first chip area devoted to one or more logic circuits, a second chip area devoted to interfacing means, and a third chip area devoted to at least one of a transmitter and receiver connected between said logic circuits and said interfacing means,
- said interfacing means comprising one or more pads each connected to a conductor for interconnecting said IC chips,
- said transmitter including a codec for receiving first signals from said logic circuits and providing second signals to said interfacing means, and
- said receiver including a codec for receiving third signals from said interfacing means and providing fourth signals to said logic circuits.

26. In a computer with monolithic IC chips interconnected for data transfers, the improvement to reduce the number of interconnections between chips including:
- at least some IC chips with a first chip area devoted to one or more logic circuits, a second chip area devoted to interfacing means, and a third chip area devoted to at least one of a transmitter and receiver connected between said logic circuits and said interfacing means,
- said interfacing means comprising one or more pads each connected to a conductor for interconnecting said IC chips,
- said transmitter for receiving first signals from said logic circuits and providing second signals to said interfacing means, and
- said receiver for receiving third signals from said interfacing means and providing fourth signals to said logic circuits, with at least one of said transmitter, receiver and interfacing means including optical means.

27. In a computer with monolithic IC chips interconnected for data transfers, the improvement to reduce the number of interconnections between chips including:
- at least some IC chips with a first chip area devoted to one or more logic circuits, a second chip area devoted to interfacing means, and a third chip area devoted to at least one of a transmitter and receiver connected between said logic circuits and said interfacing means,
- said interfacing means comprising one or more pads each connected to a conductor for interconnecting said IC chips,
- said transmitter for receiving first signals from said logic circuits and providing second signals to said interfacing means, and
- said receiver for receiving third signals from said interfacing means and providing fourth signals to said logic circuits, with at least one of said transmitter, receiver and interfacing means including acoustical means.

28. In a computer with monolithic IC chips interconnected for data transfers, the improvement to reduce the number of interconnections between chips including:

at least one IC chip with a first chip area devoted to one or more logic circuits, a second chip area devoted to interfacing means, and a third chip area devoted to at least one of a transmitter and receiver connected between said logic circuits and said interfacing means, said interfacing means comprising one or more pads each connected to a conductor for interconnecting said IC chips, said transmitter for receiving first signals from said logic circuits and providing second signals to said interfacing means, and said receiver for receiving third signals from said interfacing means and providing fourth signals to said logic circuits, wherein at least one of said first and fourth signals are analog signals.

29. The method of reducing interconnections between interconnected monolithic IC chips in a computer, including the steps of:

providing at least some IC chips with a first chip area devoted to one or more logic circuits, a second chip area devoted to interfacing means, and a third chip area devoted to at least one of a transmitter and receiver connected between said logic circuits and said interfacing means;

interconnecting said IC chips through said interfacing means comprising one or more pads connected to a conductor;

inputting first signals from said logic circuits to the transmitter and providing second signals from the transmitter to said interfacing means; and, inputting third signals from said interfacing means to the receiver and providing fourth signals from the receiver to said logic circuit, including providing the transmitter with a light emitting diode and the receiver with a photodetector.

30. The method of reducing interconnections between interconnected monolithic IC chips in a computer, including the steps of:

providing at least some IC chips with a first chip area devoted to one or more logic circuits, a second chip area devoted to interfacing means, and a third chip area devoted to at least one of a transmitter and receiver connected between said logic circuits and said interfacing means;

interconnecting said IC chips through said interfacing means comprising one or more pads connected to a conductor;

inputting first signals from said logic circuits to the transmitter and providing second signals from the transmitter to said interfacing means; and, inputting third signals from said interfacing means to the receiver and providing fourth signals from the receiver to said logic circuit, including providing at least one of said transmitter, receiver and interfacing means with optical means.

* * * * *